United States Patent
Chinnam et al.

(10) Patent No.: US 10,649,855 B2
(45) Date of Patent: May 12, 2020

(54) NETWORK CONFIGURATION METHOD TO ALLOW ACCESS TO THE BACKUP AND RESTORES TO MTREES ON A CLUSTERED BACKUP APPLIANCE

(71) Applicant: EMC IP Holding Company LLC, Hopkinton, MA (US)

(72) Inventors: Shobhan Chinnam, Cupertino, CA (US); Shefali Gautam, San Mateo, CA (US); Terry G Hahn, Los Altos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/034,218

(22) Filed: Jul. 12, 2018

(65) Prior Publication Data

US 2020/0019468 A1 Jan. 16, 2020

(51) Int. Cl.
*G06F 11/14* (2006.01)
*G06F 9/455* (2018.01)
(Continued)

(52) U.S. Cl.
CPC ...... *G06F 11/1453* (2013.01); *G06F 9/45558* (2013.01); *G06F 11/1464* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS

| 6,658,589 B1* | 12/2003 | Taylor | G06F 11/1458 707/999.202 |
| 8,223,770 B2* | 7/2012 | Wray | H04L 12/4633 370/392 |

(Continued)

OTHER PUBLICATIONS

Adding ESXi nodes in vSphere Cluster—Part 4; Johith L; May 12, 2016; retrieved from http://www.vstackl.com/2016/05/adding-esxi-nodes-in-vsphere-cluster/ on Aug. 30, 2019 (Year: 2016).*

(Continued)

*Primary Examiner* — Daniel C. Chappell
(74) *Attorney, Agent, or Firm* — Staniford Tomita LLP

(57) ABSTRACT

Embodiments for managing access to Mtrees using a mechanism through the use of net groups that contain a pool of IP addresses with configuration information that is automatically propagated to new nodes as they are added to a defined net group to facilitate zero configuration when scaling a network. Using net groups, access to an Mtree across nodes in a data center or similar network can be managed with a group of IP addresses spread across all the nodes in the cluster as a single net group entity. The net group provides flexibility to create multiple net groups that can be used to manage the appliance in management, diagnostic, data, and interconnect domains. It allows flexibility to manage the access to Mtree from different networks and security domains, and allows a user to configure the network attributes of all the IP addresses as a single entity.

14 Claims, 9 Drawing Sheets

(51) Int. Cl.
G06F 16/13 (2019.01)
H04L 12/24 (2006.01)
H04L 29/08 (2006.01)
H04L 29/12 (2006.01)

(52) U.S. Cl.
CPC .......... *G06F 16/13* (2019.01); *H04L 41/0893* (2013.01); *H04L 61/2061* (2013.01); *H04L 67/1097* (2013.01); *G06F 2009/45595* (2013.01)

(58) Field of Classification Search
CPC ..... G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; H04L 41/00–5096; H04L 49/00–9094; H04L 61/00–6095; H04L 67/00–42
See application file for complete search history.

(56) References Cited

U.S. PATENT DOCUMENTS

| | | | | |
|---|---|---|---|---|
| 8,886,781 B2* | 11/2014 | Jain | ...................... | G06F 3/0611 709/223 |
| 8,949,829 B1* | 2/2015 | Xing | ................... | G06F 11/1469 718/1 |
| 9,047,311 B2* | 6/2015 | Bandic | ................ | G06F 16/1844 |
| 9,201,891 B2* | 12/2015 | Romanski | .......... | G06F 12/0253 |
| 9,628,561 B1* | 4/2017 | Kulkarni | ............. | H04L 67/1095 |
| 9,632,892 B1* | 4/2017 | Sledz | .................... | G06F 16/178 |
| 9,639,555 B1* | 5/2017 | Faibish | ...................... | G06F 3/06 |
| 9,755,854 B2* | 9/2017 | Maeda | ................ | H04L 12/4645 |
| 10,001,927 B1* | 6/2018 | Trachtman | .............. | G06F 3/061 |
| 2004/0202171 A1* | 10/2004 | Hama | ................ | H04L 12/4641 370/395.1 |
| 2007/0214384 A1* | 9/2007 | Kitamura | ............ | G06F 11/1464 714/13 |
| 2017/0177652 A1* | 6/2017 | Danilov | ................ | G06F 3/0608 |
| 2018/0260125 A1* | 9/2018 | Botes | .................... | G06F 3/0617 |
| 2019/0188047 A1* | 6/2019 | Dao | ...................... | G06F 9/5077 |
| 2019/0213267 A1* | 7/2019 | Agarwal | ............ | G06F 3/0643 |
| 2019/0227878 A1* | 7/2019 | Agarwal | ............ | G06F 9/45558 |

OTHER PUBLICATIONS

Hardware support for spin management in overcommitted virtual machines; Wells et al.; Proceedings of the 15th international conference on Parallel architectures and compilation techniques, pp. 124-133; Sep. 2006; retrieved from http://ftp.cs.wisc.edu/sohi/papers/2006/pact2006-spin-vm.pdf on Dec. 30, 2019 (Year: 2006).*

* cited by examiner

NETWORK CONFIGURATION METHOD TO ALLOW ACCESS TO THE BACKUP AND RESTORES TO MTREES ON A CLUSTERED BACKUP APPLIANCE

TECHNICAL FIELD

Embodiments are generally directed to network storage systems, and specifically to managing access to Mtrees on a clustered backup appliance.

BACKGROUND

In current single-node computer systems, all clients communicate with the system and ingest data into the node. Cluster systems represent a scale-out solution to single node systems by providing a set of networked computers that work together so that they essentially form a single system. Each computer forms a node in the system and runs its own instance of an operating system. The cluster itself has each node set to perform the same task that is controlled and scheduled by software. Capacity is naturally increased based on the number of computers and is easily scalable by adding or deleting nodes, as needed.

In a deduplication backup system utilizing virtual machines (VMs), each VM runs its own file system, such as a Data Domain Restorer (DDR) or Data Domain File System (DDFS) by EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares. Files and directories for each namespace are usually stored in Mtrees, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness.

Access to Mtrees is traditionally managed at an individual IP address level. It is relatively simple manage access to Mtrees on a single backup appliance. However, when the backup appliance is built on a cluster with multiple nodes, managing accesses to an Mtree using individual IP addresses becomes more complicated with the increased number of nodes. Thus, under current systems based on single-node backup appliances, access using a single IP address is simple. In advanced systems that have multiple nodes, multiple IP addresses are required, and access to Mtrees for such multiple IP addresses can be problematic.

What is needed, therefore is a system that provides simple access to backup and restore datasets on Mtrees on a clustered backup appliance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1A:
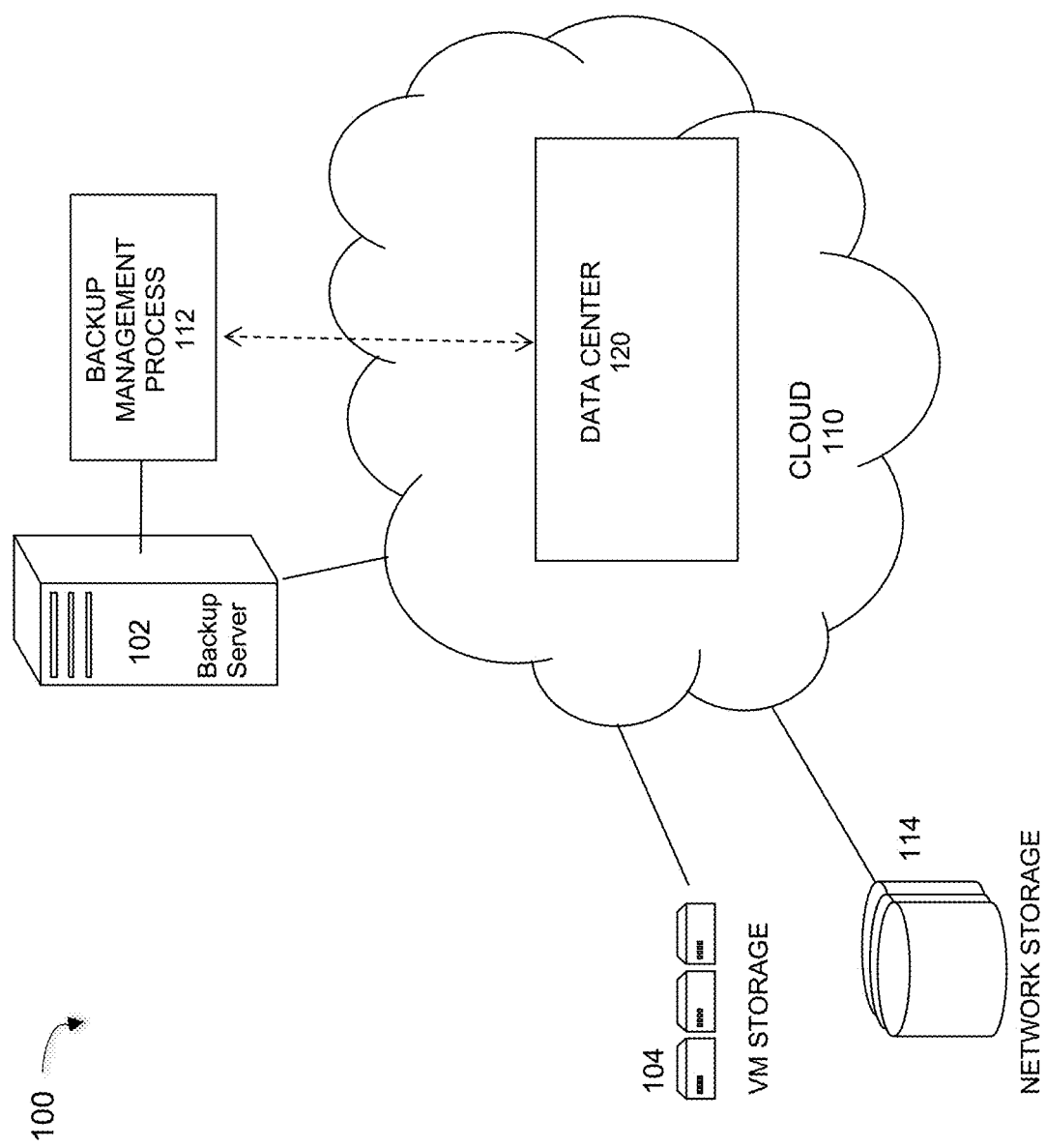
FIG. 1A illustrates a computer network that implements a compliance service process for backup systems, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Disclosed herein are methods and systems directed to managing access to Mtrees using a mechanism referred to as "net groups" through a method referred to as a "clustered backup appliance access" method. In this method, the access to an Mtree across nodes in a data center or similar network can be managed with a group of IP addresses spread across all the nodes in the cluster as a single net group entity. The net group method provides flexibility to create multiple net groups that can be used to manage the appliance in management, diagnostic, ingest and interconnect domains. It allows flexibility to manage the access to Mtree from different networks and security domains. It also allows a user or customer to configure the network attributes of all the IP addresses as a single entity.

Embodiments of the clustered backup appliance access method may be used in large data center applications that contain many computer resources (nodes) that are organized in different ways, such as by function or purpose, and that may be part of networks or subnetworks that regularly grow or shrink depending on the changing needs of an organization. FIG. 1A illustrates a computer network system that uses a net group process to access Mtree nodes in a clustered backup appliance, under some embodiments. System 100 comprises a large-scale network that includes a number of different devices, such as server or client computers 102, data center 120, storage devices 114, and other similar devices or computing resources. Other networks may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1A is intended to be an example of a representative system implementing a clustered backup appliance access process under some embodiments, and many other topographies and combinations of network elements are also possible.

For the example network environment 100 of FIG. 1A, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale data centers that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, network server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single, filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell EMC Avamar, Dell EMC Networker, Dell EMC Greenplum, Veritas NetBackup, Veritas Backup Exec, Oracle RMAN and Quest vRanger, and other similar programs).

Mtree Implementation for Deduplication Backup Systems

FIG. 1A illustrates a computer network system 100 that implements one or more processes optimized for use in deduplication backup systems. For the embodiment shown in FIG. 1A, each external VM 104 (VM1 to VMn) or internal data center 120 VM runs its own Data Domain File System (DDFS) for a deduplication backup application, along with other possible applications. In the DDFS file system, protocol-specific namespaces are presented to clients/applications for accessing the logical file system layer. Some example protocol namespaces include: Data Domain Virtual Tape Library, Data Domain Boost storage units, and CIFS/NFS fileshares. Files and directories for each namespace are stored in an Mtree, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness. Other similar data structures to Mtrees may be used, and embodiments are not so limited.

In the Data Domain Operating System filesystem, protocol-specific namespaces are presented to clients/applications for accessing the logical filesystem layer. The files and directories in each Mtree, as well as Mtree snapshots, all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 1B:
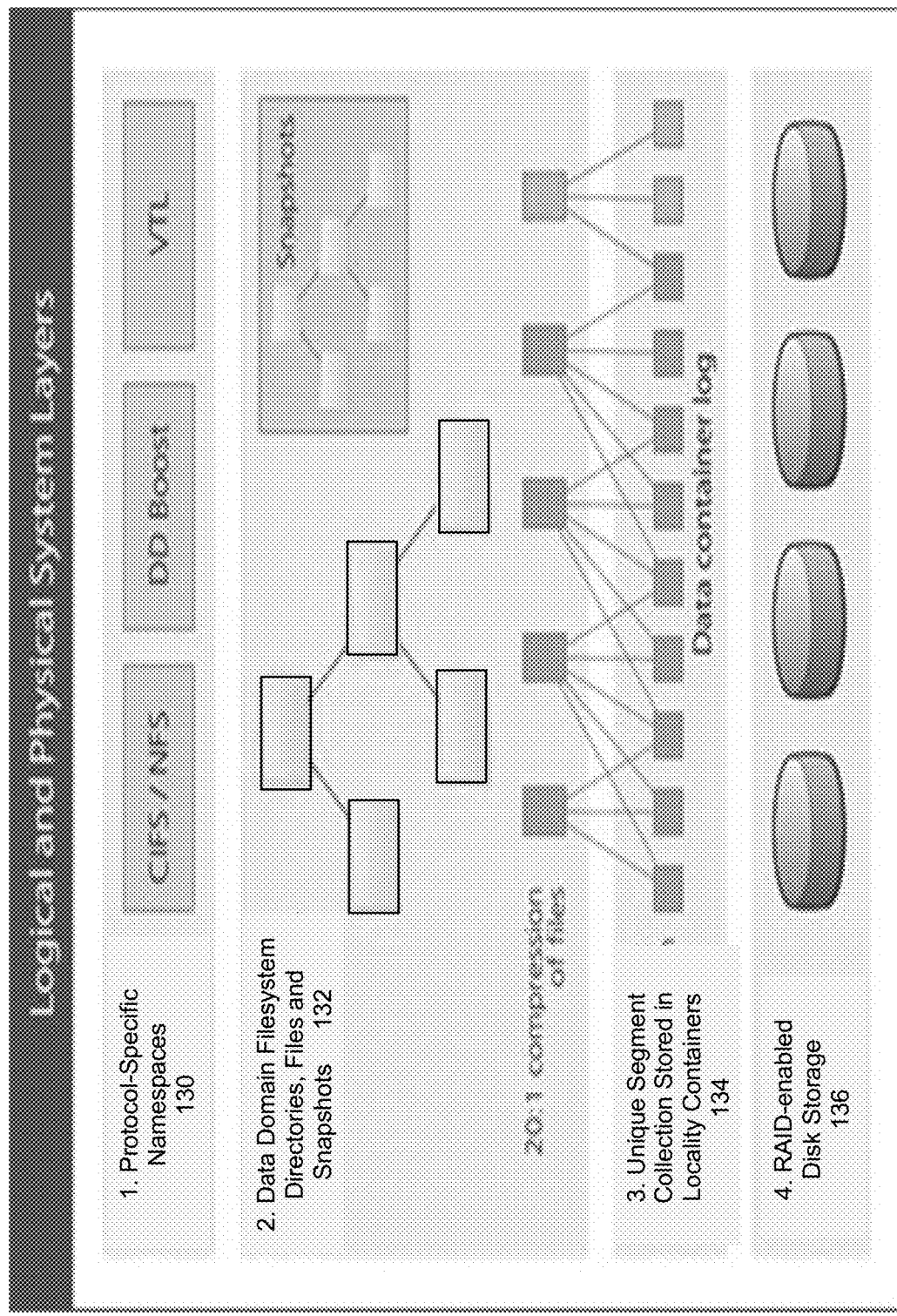
FIG. 1B illustrates levels of data abstraction in a Data Domain system including Mtrees that implement a clustered backup appliance access method, under some embodiments.

FIG. 1B illustrates levels of data abstraction in a Data Domain system including Mtrees that implement a clustered backup appliance access method, under some embodiments. As shown in FIG. 1B, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem MTrees, directories, files and snapshots layer 132 contain the files and directories for each namespace that are stored in an Mtree in the DDOS filesystem. Mtree snapshots in DDOS are logical and very space-efficient because they share the same underlying data segments. A unique segment collection 134 is stored in locality containers: A 'collection' is the set of files (or virtual tapes) and logical Mtree snapshots. The system identifies and eliminates duplicate segments within each container and then writes compressed deduplicated segments to physical disk. Segments are unique within the collection (not including specific duplicates maintained in DDOS to enable self-healing or fast recovery). Each Data Domain system has a single collection that is stored in a log of segment locality containers. The RAID-enabled disk storage layer 136 comprises a collection containers layer over RAID enabled disk drive blocks to ensure data security and integrity.

An Mtree replication process may be used to replicate MTrees between Data Domain systems and can be used replicating data written via CIFS, NFS, or VTL. Unlike collection replication, Mtree replication offers flexible replication topologies like one-to-one, bidirectional, one-to-many, many-to-one and cascaded. It also offers the flexibility to selectively replicate only a portion of the data written to the source system. Files replicated from the source will land on the destination active tier first regardless if the data is on the active tier or retention tier. This provides the flexibility to the user to set different data movement policies between the source and destination. Managed file replication is used when integrating with applications via Dell EMC Data Domain Boost (e.g. Dell EMC NetWorker, Dell EMC Avamar, Veritas NetBackup, Oracle RMAN, etc.). With managed file replication, backup applications can selectively replicate specific backup images and keep track of all the copies in the application's catalog for easy recovery. Further, the backup application can configure separate retention periods for each copy of the backup image.

Virtualization Architecture

As shown in FIGS. 1A and 1B, one or more aspects of system 100 may be embodied using virtualization technology that allows computer resources to be expanded and shared through the deployment of multiple instances of operating systems and applications that run virtual machines. A virtual machine network is managed by a hypervisor or virtual machine monitor (VMM) program that creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating systems may share the virtualized hardware resources. For example, different OS instances (e.g., Linux and Windows) can all run on a single physical computer. In an embodiment, system 100 illustrates a virtualized network in which a hypervisor program supports a number (n) VMs 104. A network server supporting the VMs (e.g., network server 102) represents a host machine and target VMs (e.g., 104) represent the guest machines. Target VMs may also be organized into one or more virtual data centers or as part of data center 120 representing a physical or virtual network of many virtual machines (VMs), such as on the order of thousands of VMs each. These data centers may be supported by their own servers and hypervisors.

Figure 2:
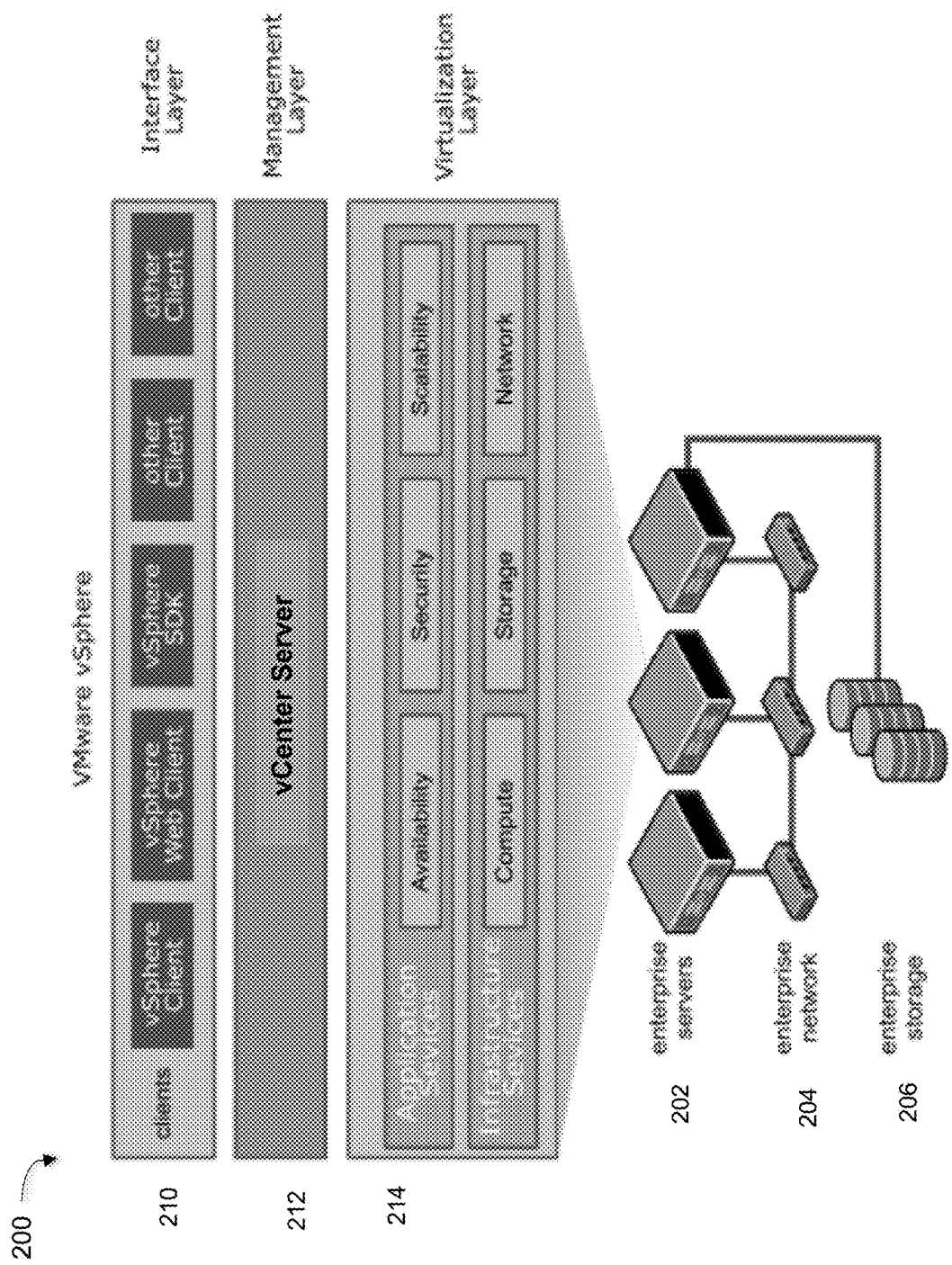
FIG. 2 illustrates a vSphere virtualization system that implements a clustered backup appliance access method, under some embodiments.

For the purpose of example, embodiments are described in relation to a virtualization infrastructure represented by the VMware vSphere™ system, though embodiments are not so limited. FIG. 2 illustrates a vSphere virtualization system that implements a clustered backup appliance access method, under some embodiments. System 200 of FIG. 2 represents components within data center 120 including enterprise servers 202, enterprise network 204 comprising routers, switches, interconnects, etc., and enterprise storage 206 comprising hard disk drives, tape drives, virtual storage devices, etc. These devices are managed by the vSphere system that comprises an interface layer 210, a management layer 212, and a virtualization layer 214. The interface layer comprises client processes such as network and web clients, software development kits (SDK), and other clients that allow users to remotely connect to the server. The virtualization layer 214 comprises application services and infrastructure services, and the management layer 212 includes a hypervisor (e.g., VMware ESXi) that abstracts processors, memory, storage and other resources into multiple virtual machines, and management software that provide the central control point for data center services across multiple hypervisor hosts.

Other components or processes provided by the vSphere system 200 include high availability processes, distributed resource schedulers or storage load balancers, fault tolerance, host profile managers, and so on. System 200 may also implement a virtual machine file system (VMFS) that provides a high-performance cluster file system for ESXi (or other hypervisor) VMs. It can also implement a distributed switching system that enables a single virtual switch to connect to multiple hosts in a cluster or multiple clusters for centralized management of network configurations. The system 200 of FIG. 2 illustrates one example of a virtualized environment that can be used to implement certain embodiments described herein, and embodiments are not so limited.

Figure 3:
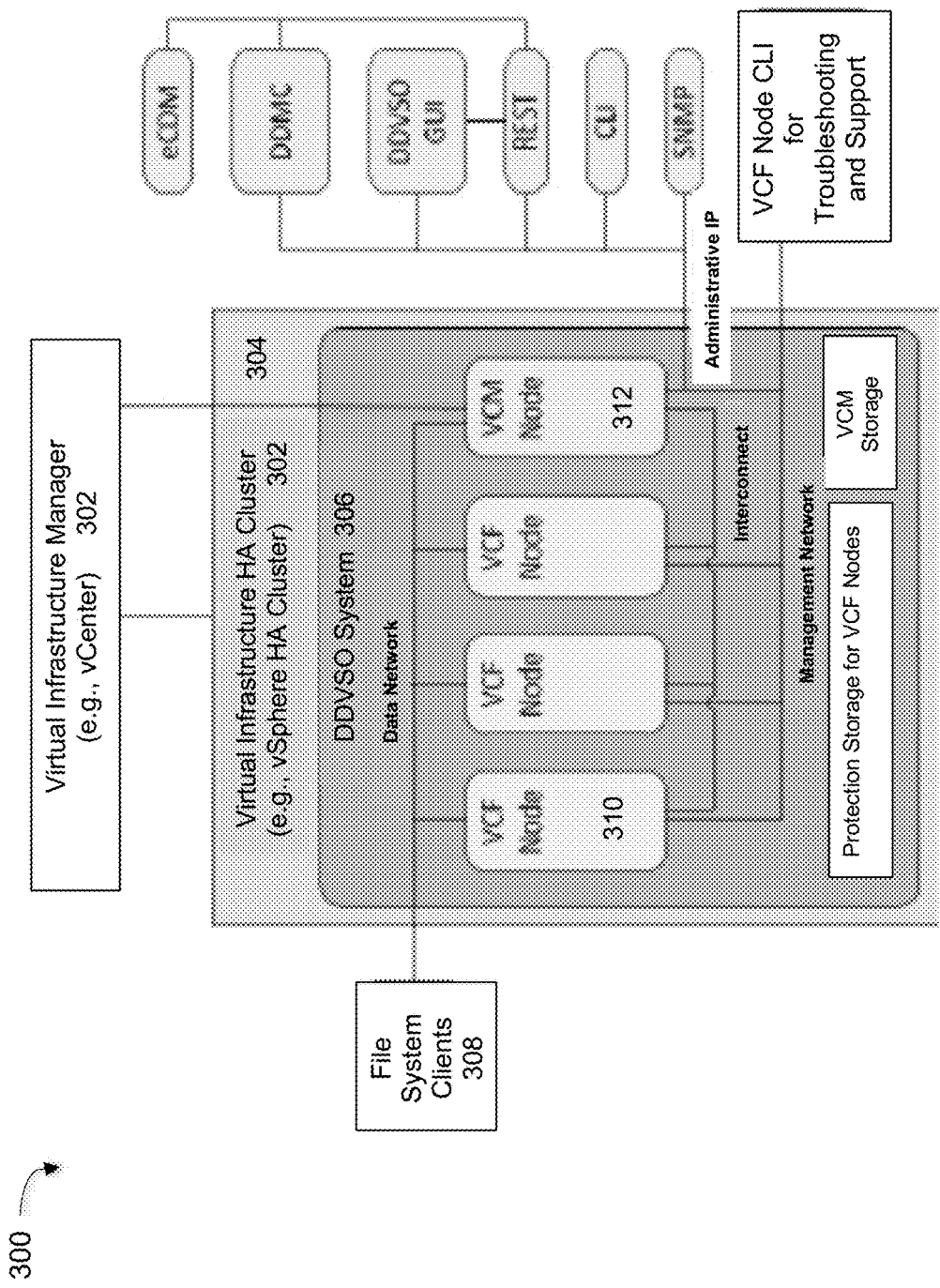
FIG. 3 illustrates an example VSO system running a high availability cluster providing access to a clustered backup appliance, under some embodiments.

The vCenter server 212 of system 200 generally provides a centralized platform for managing the vSphere environment and allows users to automate and deliver a virtual infrastructure across hybrid clouds and other similar networks. In an embodiment, the vCenter server implements a virtual protection storage appliance referred to as a "virtual scale-out" (VSO) system that grows or scales its protection storage until it exhausts one or more of its assigned vCenter resources, or it reaches a configured limit for attached storage. FIG. 3 illustrates an example VSO system running a high availability cluster providing access to a clustered backup appliance, under some embodiments.

Diagram 300 illustrates the deployment of VSO in a vCenter 302, where it runs in a vSphere HA (high availability) cluster 304. The VSO System serves its file system from one to many Virtual Cluster Filesystem (VCF) node VMs 310. A VCF node may also be referred to as a data node. When the VSO is first installed and boots up, only the Virtual Cluster Manager (VCM) node 312 is running. After deploying the protection storage, the VSO System adds one or more VCF nodes to serve the configured initial amount of storage. The VSO system automatically adds more VCF nodes as required (e.g., when existing VCF nodes cannot serve enough storage to meet the demand), which are all accessible to file system clients 308. All of the VSO nodes (VCF and VCM) are connected to each other via an IP network called the interconnect, which is used for intracluster file system data transfer, and internal cluster monitoring and control. The VSO protection storage file system is accessible to file system clients via a one or more external IP networks called data networks. Each data network is connected to all of the VSO nodes. All of the VSO nodes are connected to each other via the management network. The VCM node has an IP address on the management network which can be used to manage the overall VSO system. Each VCF node also has an IP address on the management network. The IP address on the VCF node only allows secure socket shell (ssh) access to a command line interface (CLI).

In an embodiment, all of the VCM and VCF node ethernet devices (ethV0, ethV1, ethV2) are connected to ports on a virtual switch (vSwitch), or a distributed virtual switch (dvSwitch). As when using a physical switch, each ethernet device can only be connected to a single vSwitch port. Ports in a vSwitch are organized (e.g., by a system administrator) into distinct subsets of ports, called port groups, or distributed port groups, when a distributed virtual switch is used. In general, port group management is performed by the hypervisor.

In an embodiment, a net group defines resources associated with a network. At a minimum it includes a set of IP addresses, a net mask or IPv6 prefix, and an MTU setting. When associated with a VSO network, IP addresses for the VSO network are assigned from the net group's set of IP addresses. VSO node ethernet devices associated with a VSO network are configured with the net group's properties (an IP address from the net group, etc.). VSO networks in some cases can share the same net group.

Clustered Backup Appliance Access for Mtrees

Figure 4:
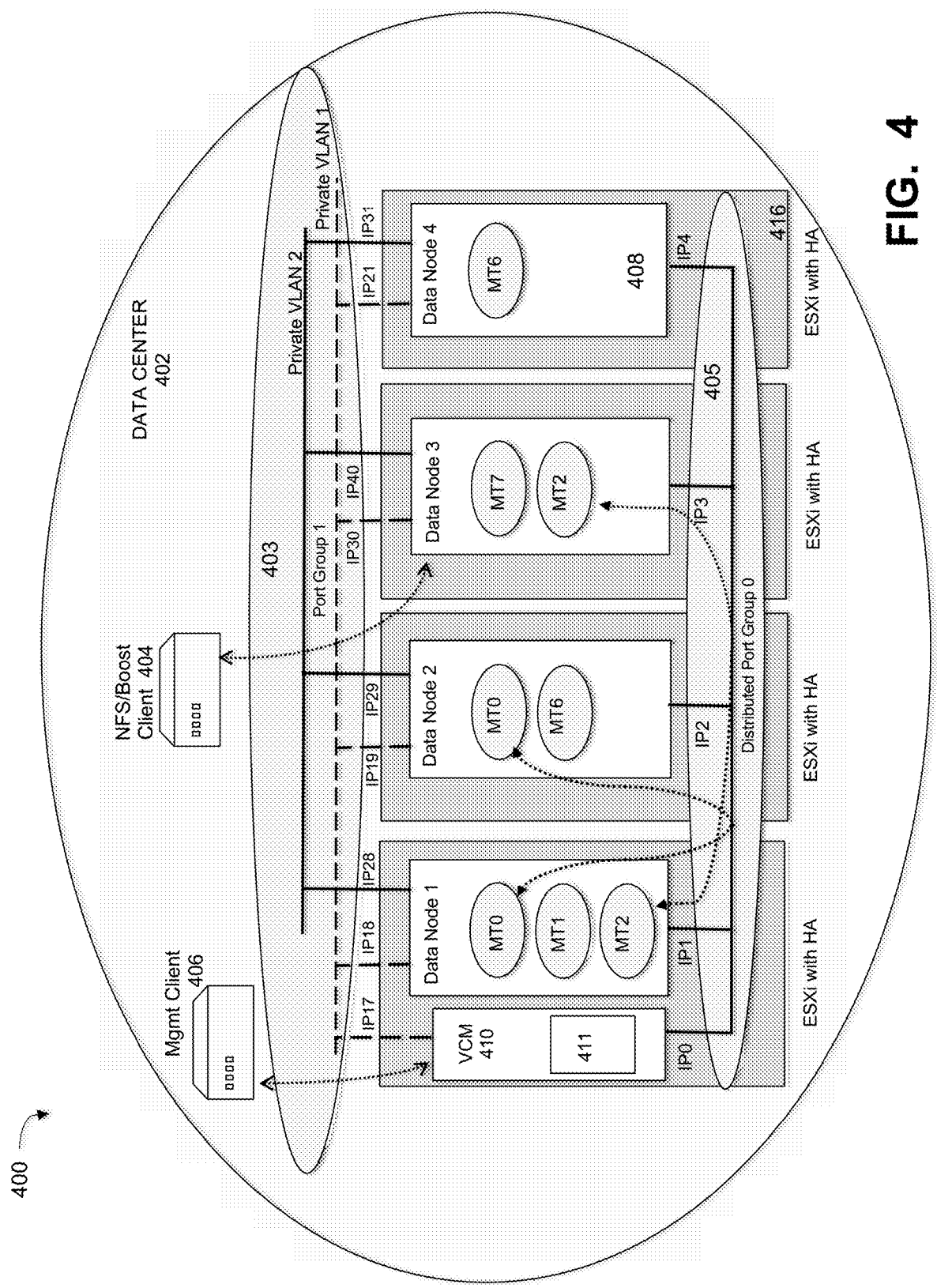
FIG. 4 illustrates the organization of VSO nodes into port groups and the processing of Mtrees in data nodes in a data center, under some embodiments.

FIG. 4 illustrates the organization of VSO nodes into port groups and the processing of Mtrees in data nodes in a data center, under some embodiments. As shown in system 400, data center 402 contains a number of hypervisor instances 416 each running a respective data node 408, denoted Data Node 1-4. Various port groups, such as port groups 403 (denoted Port Group 1) and 405 (denoted Port Group 0) are configured to provide communication paths between and among the nodes. Port group 1 403 contains a private VLAN 1 which comprises a management network. External management clients can use this network to show individual node configuration, status, statistics, etc., and monitor the nodes; support uses this network to access the nodes to help diagnose and fix problems; and the nodes use this network to send SNMP traps, alert e-mails, auto-supports, etc. to external management clients. The management VLAN (VLAN1) also provides a connection to the management VCM 410. The private VLAN2 of port group 1 also includes a data network among the data nodes 408 to provide access to file system data using NFS, CIFS, Boost, Cloud, Replication, and other similar functions.

Port group 0 405 represents an interconnect network that is used for internal inter-node communication. has special properties (e.g., secured connections, etc.) for communication between the nodes for functions such as FM redirection, file migration, inter-node SMS and so on. Inter-node communication is treated as internal network and ideally isolated from external traffic in all ways possible for best security and performance. The management and data network are treated as external networks from where the customer can access the services provided by the cluster. The scaleout cluster user uses the VCM 410 to configure different networks, the VCM in turn applies the settings on the data nodes (VCF) 408 over interconnect. The CLI user, as exemplified by management client 406, is allowed read only access to the configuration on the data nodes. This will allow consistent behavior where all cluster configurations can be accomplished using only the VCM. The network access to the VCM is used primarily for management access to the customer, and interconnect access to apply the configuration settings onto the data nodes 408. Similarly, the network access on the data nodes shall be used to provide read-only management access to the customer and interconnect access to allow for VCM to data node and data node to data node communication and data access for ingest using different data protocols like NFS, CIFS, Boost and Replication, such as from client 404. It should be noted that ingest typically means data being written to the system by backup applications and other data protection software (e.g., Oracle RMAN), but the file system data can also be read by an external client over the data network to restore a backup, for example. Also, the data network can be used to send file system data to external systems, such as to replicate data or send it to the cloud. Each scaleout cluster uses one dedicated network 403 for interconnect, so that all the nodes VCM and data nodes can communicate with each other transparently. The interconnect is used for both internal management and data traffic like file migration and server redirection.

The scaleout solution of system 400 uses VLANs to isolate the data traffic, so that the interconnect 403 uses one VLAN, the management network uses one VLAN, and one or more data networks which each use one VLAN. Each network spans a range of IP addresses or a collection of IP addresses. The data network allows access to the Mtrees contained in the data node. For the example of FIG. 4, Data Node 0 contains Mtrees MT0, MT1, and MT2; Data Node 2 contains Mtrees MT0 and MT6, Data Node 3 contains Mtrees MT7 and MT2 and Data Node 4 contains MT6. All Mtrees are associated with all data networks during Mtree creation. A data network IP address is associated with a data node and the Mtrees on any data node can be accessed by any IP address on the data nodes of the cluster. The backup application uses the IP address associated with the data networks to access Mtree for all ingest traffic, such as from NFS/Boost client 404. The IP address associated with the Mtree on the node on which it is created at the time of creation allows the client to do metadata lookups and can be called the primary IP for the Mtree. Modern data protocols like NFSv4 have the capability to do metadata lookups from one IP address and fetch data from a different IP address using client redirection mechanism. However, older protocols can use only one IP address for both metadata lookups and data fetch operations. In a cluster environment it is normal to allow movement of services across the cluster for high availability and load balancing purposes. Similarly, Mtrees can be moved, expanded from one node to the other. In such scenario access to the Mtree with the primary IP address and allowing capability to do data fetch operations for older protocols using server redirection through the interconnect network is also important.

Embodiments of a clustered backup appliance access method within the VCM 410 provide the flexibility to associate Mtree with a primary IP address and multiple secondary IP address to meet such requirements. A secondary IP address is any IP address on the cluster on the data network that is not on the node on which the Mtree is created. An Mtree is also associated with the interconnect IP addresses of all data nodes that contain its file data. This means access to Mtree is allowed from any IP address resident on data node on the data network of the cluster. This provides both legacy support for older protocols using server redirection from the Mtree's primary IP via the interconnect to the data node, and using client redirection to avoid interconnect access when using newer protocols. (e.g., NFSv4 and Boost can pick the secondary IP addresses for client redirection for best performance).

As stated above, current backup systems are typically single-node systems and do not allow for capacity expansion once the node is full. In a cluster system, each node hosts one or more collection partitions (CP). This collection partition contains files from different Mtrees across the cluster, and access to these files must be balanced.

Embodiments of a clustered backup access process or component 411 provided in VCM 410 include processes that allow: (1) provisioning of IP addresses across the nodes in cluster to simplify the customer configuration experience; (2) configuring the IP addresses as a single net group to simplify configuration from network and security aspects; (3) allowing the flexibility to have multiple net groups to facilitate management and backup/restore of the backup appliance for different customer use cases for management, diagnostic, security, performance and ingest; and (4) relieving the customer of the need to map and manage the IP address to network interface as each net group is mapped to virtual infrastructures port group which is defined at the time of initial configuration based on customer environment.

The clustered backup appliance access method 411 provides a pool of IP addresses to access different Mtrees as organized into different net groups. This gives access to different Mtrees and leverage CPU and memory and streams on those nodes to give better performance, and also allow for load balancing, and other similar mechanisms. The association of Mtrees with net groups thus gives easy access to multiple Mtrees across different nodes (backup appliances) and provides zero configuration capability when the cluster grows by automatically associating defined configurations, permissions, access definitions, and other defined characteristics to the new nodes of a net group. In general, the VCM provides symmetric node configuration so that all new nodes in a scaled out node have the same configuration. To accommodate flexibility, nodes not to be so configured would not be assigned to a particular net group.

The network access in a scaleout cluster is performed in the management, data and inter-node communication domains. In an embodiment, the network configuration of VSO deployment where the data and management network for the VCFs are configured separately. The customer can choose to use the same port group for management and data network or can have a separate port group for each. Based on the port group functionality, net groups can be assigned for the three main network functions: management, data, and interconnect, though other functions can also be assigned for other net groups. A net group generally consists of a pool of IP addresses and configuration information for nodes in the net group. A net group generally does not include a list of nodes, as nodes are implicitly associated with a net group when the nodes host objects that are accessed via the net group. For example, a node that contains, or could contain, an Mtree's metadata or file data, will be configured with all of the data network net groups associated with that Mtree. Another example, for certain tenant requirements (e.g., using tenant supplied encryption keys to encrypt tenant data at rest), the tenant is hosted on one or more nodes that are dedicated to only that tenant. Those nodes will be configured with the data network net groups associated with that tenant. A customer may configure logical entities like Mtrees, tenants, net groups, networks (data, management, interconnect), etc., and their explicit associations to each other, but will not explicitly associate nodes to net groups.

Existing nodes in a net group are configured according to the configuration information and are assigned a first or initial set of IP addresses. Nodes added to the net group are then assigned respective IP addresses from the net group IP address pool and are configured with the same configuration information. If a node is removed from a net group, its IP address may be returned to the pool.

In an example use case, a typical customer will use networking feature at the time of setting up the cluster. The customer picks the IP address range, subnets and VLANs for interconnect, management and data networks at initial configuration of the cluster. The setup interconnect, management and at least one data network must be defined before creating Mtrees on the cluster. This configuration is persisted and as the cluster expands by adding nodes the IP addresses are assigned to the nodes from the persisted pools of interconnect, data and management IP address range. The customer is also allowed to configure the management, interconnect and data network each as a single entity as customer environment needs to readjusted. When configuring a network as a whole the same settings do not need to be applied individually to each interface in the network, but one user action to configure a network domain will trigger the change on all the interfaces in that domain. The customer can use management network to configure the cluster from VCM using CLI, REST API and GUI. Data network on the VCF nodes is used for data ingest from NFS, Boost, CIFS and Replication. The management network on VCF can also be used by the customer and support to monitor the VCF settings and health. The interconnect network is used by VCM to monitor, configure and event notification to the VCF nodes. VCF to VCF traffic will be primarily file migration, server redirection and event notification.

In an embodiment, a scaleout cluster is designed to work in different hypervisor and cloud environments. In ESXi hypervisor environment, in order to meet the isolated network requirement for interconnect, the servers on which the scaleout cluster has to run should be part of a customer provided distributed virtual switch. This will allow the cluster to use the interconnect for inter-node communication and also allow the nodes in the cluster to migrate to different server based on environment and customer needs, but continue to function as expected. Private VLANs are also provided to isolate the traffic on the interconnect, management and data networks for better security and performance. Distributed port groups are also created to configure the distributed virtual switch which aggregates the network configuration to the cluster of VMs that operate on the distributed switch. The distributed port groups can be configured using several methods, configuring a private community VLAN for the port group, reserving a dedicated VLAN for the port group, using dedicated VNICs for the virtual switch, and allowing only one port group on this virtual switch.

Figure 5:
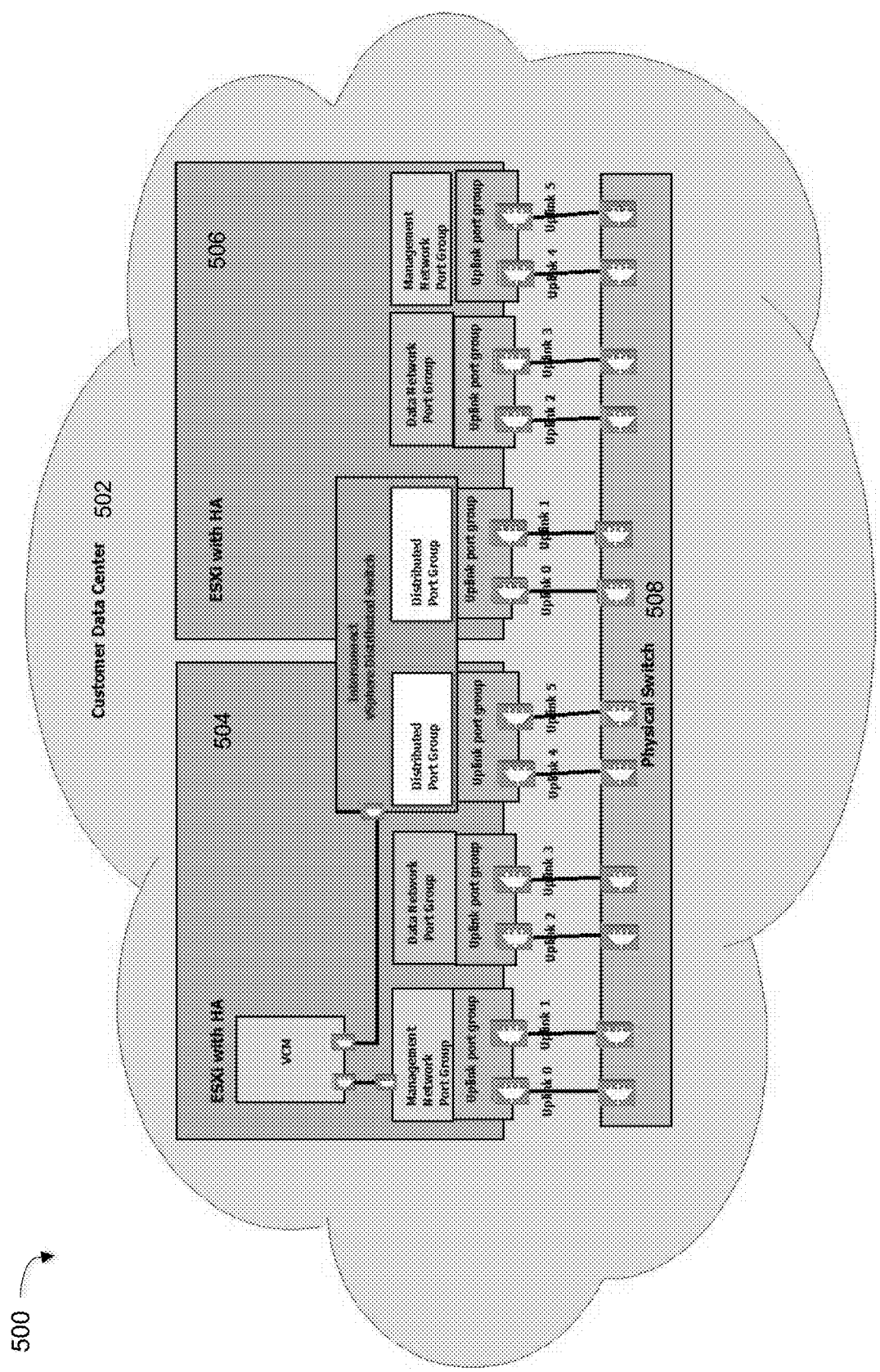
FIG. 5 illustrates a data center having separate port groups for management, data and interconnect networks.

FIG. 5 illustrates a data center 502 having separate port groups for management, data and interconnect networks as shown for two example hypervisor instances 504 and 506. For the embodiment of system 500, the management, data and interconnect networks are configured in the vSphere or VPC. On the hypervisor 504 or 506, the customer allocates a set of servers for VSO deployment and groups them into a vSphere cluster and configures them with a distributed switch 508. For example, in a typical implementation, the customer may need to ensure that the distributed switch has two 10 gigE ports assigned from each server, to ensure high availability and also facilitate for enough throughput. The data network can be configured with a port groups assigned to a virtual switch with a minimum of two physical 10GigE NICS assigned on each server for high availability and throughput. The management network can share the port group created for data network or a different port group can be setup for management network if the customer has enough ports.

On VCM deployment the virtual network interface cards (VNICS) of the VCM are mapped to the interconnect and the management networks during deployment. After deployment VCM is configured with the network, management and data network port groups and range of static IP addresses allowed on each network. The MTU, gateway and route attributes can also be configured at this time. After at least one management, interconnect and data network is configured with port groups and the required network attributes, the VCM can be used to configure Mtrees.

Figure 6:
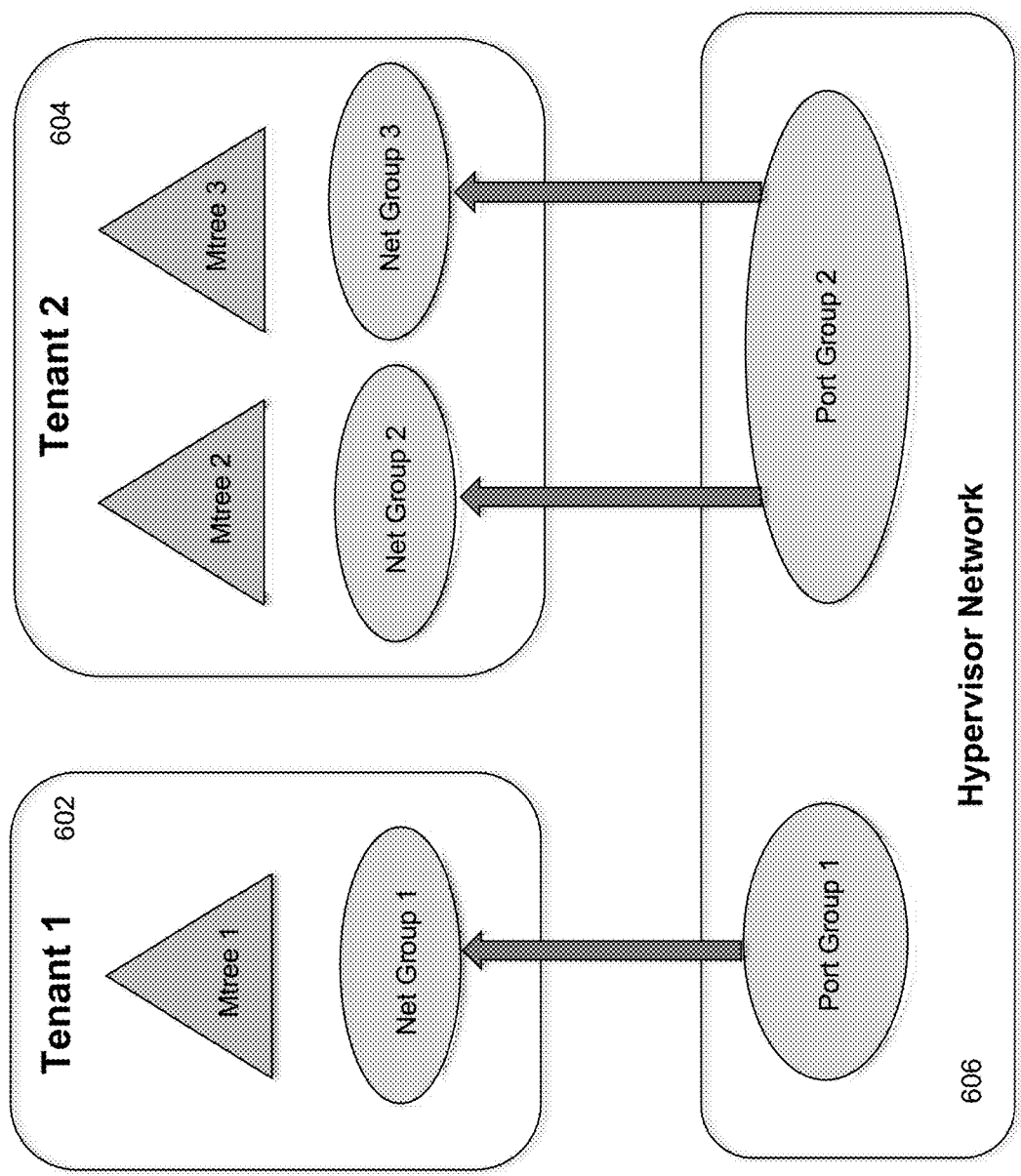
FIG. 6 illustrates the relationship between net groups and port groups for an example clustered backup appliance in a multi-tenant context, under some embodiments.

FIG. 6 illustrates the relationship between net groups and port groups for an example clustered backup appliance in a multi-tenant context, under some embodiments. As shown in FIG. 6, two tenant networks 602 and 604 are managed by hypervisor 606. Tenant 1 602 comprises Mtree 1 and net group 1, and Tenant 2 604 comprises Mtree 2 and Mtree 3, and net group 2 and net group 3. The net group 1 is associated with port group 1, while the port group 2 is associated with both net group 2 and net group 3. Users benefit from restricting access to certain Mtrees to only specific tenants for increased security and isolation. This will also help with the security audit requirements that user data centers may have in place, for example, to avoid different departments within the same organization from accessing each other's Mtrees.

The following example code segment provides an example of a net group definition, under some embodiments, such as for the example of FIG. 6.

```
struct netgroup
{
    int group_id;
    char *group_name;
    struct ipaddr *ipaddress_list;
    int ipaddress_list_count;
    int mtu;
    char * netmask;
    int vlan_tag;
    struct route routes;
    :
    :
    :
};
struct tenant{
    int uid;
    char *name;
    struct mtree *mtreelist;
    int num_mtrees;
    struct netgroup *netgrouplist;
    int num_netgroups;
    struct ipaddr *client_iplist;
    int num_client_ips;
    :
    :
};
```

The above code segment is provided for purposes of example only, and embodiments are not so limited. Any equivalent or similar program or program structure may be used to implement a netgroup depending on system configuration, constraints and requirements.

In an embodiment, the clustered backup appliance access method allows a customer to create specific net groups and associate specific Mtrees to these net groups. A net group can be associated with the functionality of a network, such as management, data, or interconnect. The net group comprises a pool of IP addresses, along with corresponding configuration information. As a cluster grows, the net group is used to propagate IP addresses and configuration information to new nodes so that there is no need to individually configure every new node that is added. It also allows for the system to seamlessly increase the name space with zero configuration, as there is no need to associate or manage movement of Mtrees. As the cluster grows, a management node keeps track of the nodes and propagates IP addresses from the net group IP address pool and configuration information to the new nodes.

A cluster may have different types of networks, such as: management, data and interconnect networks. Each network must be associated with a port group, which determines the type of the port group. Each port group of a certain type (e.g., management) should attach to a particular interface (e.g., ethV0) on each node in the cluster. Port groups on the switch or switches are defined by enumerating the switch ports in each port group. For example: switch ports 1-10 for Management, switch ports 11-20 for interconnect, switch ports 21-30 for data. Upon configuration, a customer could specify that they want all management traffic to go through one port group, all data to go through another port group, and so on. This allows traffic isolation to be user defined. The port group defines the physical infrastructure that provides isolation at that level. The net group mechanism provides a network configuration on top of the port group definition that allows for association of IP addresses and configurations with specific Mtrees.

Figure 7:
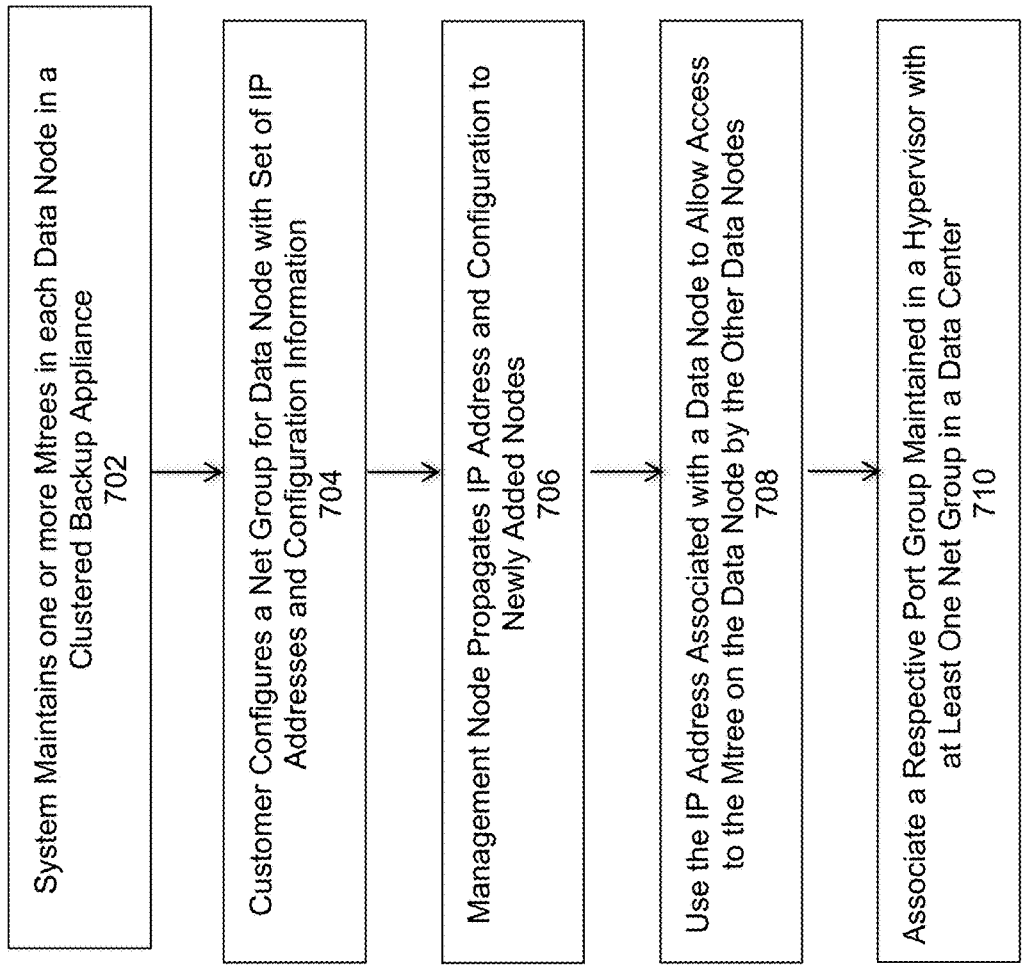
FIG. 7 is a flowchart that illustrates a method of provisioning of IP addresses across nodes and clusters for access in a clustered backup appliance, under some embodiments.

FIG. 7 is a flowchart that illustrates a method of provisioning of IP addresses across nodes and clusters for access in a clustered backup appliance, under some embodiments. The system maintains Mtrees in each data node in the cluster, 702. Initially, the customer creates a net group with a set of IP addresses and associated configuration information, 704. The configuration information can include IP addresses, VLAN, gateway info, and other relevant information. The set of IP addresses comprise a pool of addresses that are consumed as cluster grows and assigned to newly added nodes. The management (VCM) node provides the IP address and configuration as needed, and keeps track of what IP addresses have been allocated, or have been returned after dis-assignment, 706. In this manner, new IP addresses and configurations are propagated to new nodes automatically. In step 708, the system uses an IP address associated with a data node to allow access to the one or more Mtrees on the data node by clients connected to any IP address on other data nodes of the clustered backup appliance. The net group in a data center is associated with a port group maintained in a hypervisor, 710.

System Implementation

Figure 8:
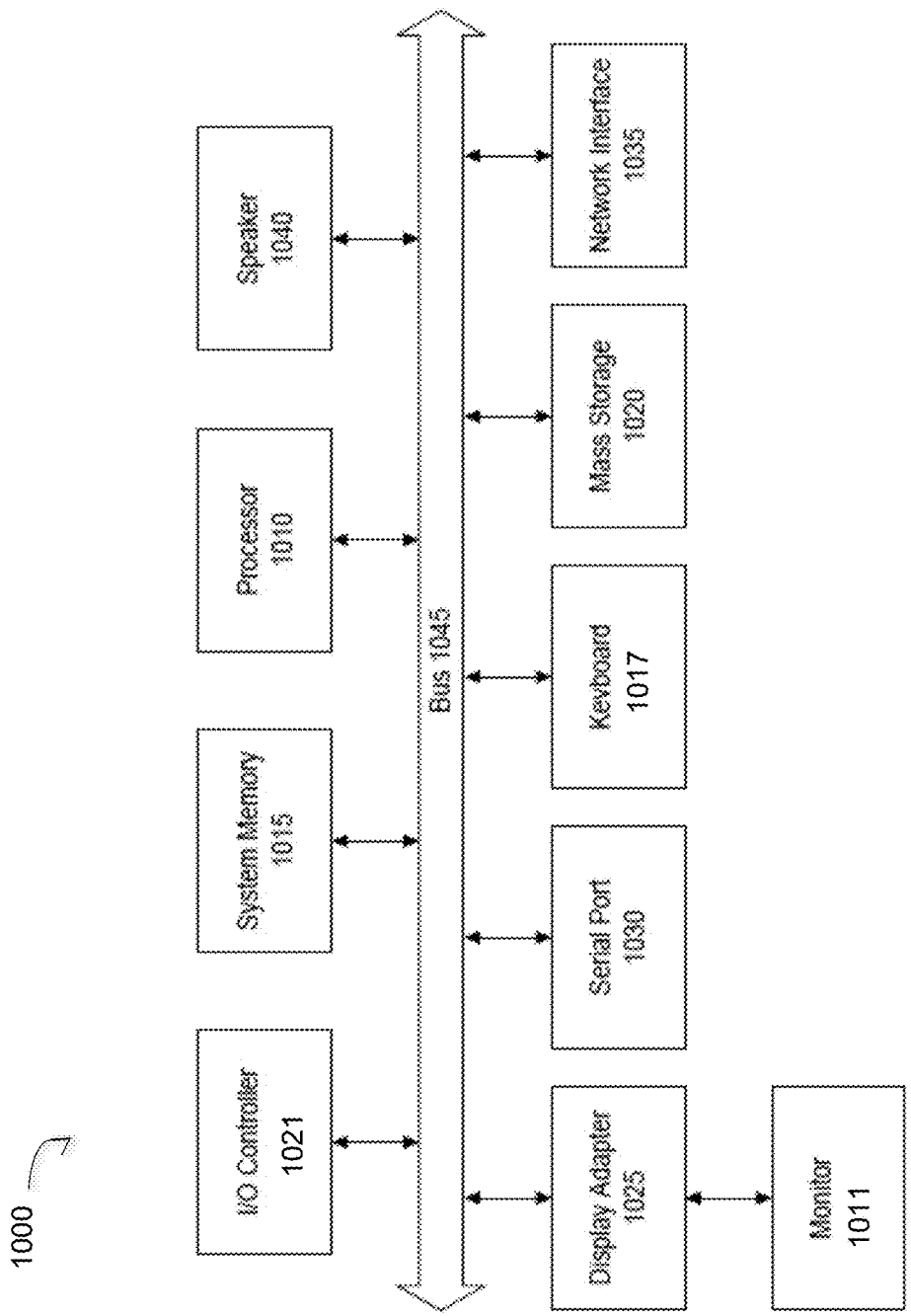
FIG. 8 is a block diagram of a computer system used to execute one or more software components of a cloud-based compliance service for backup applications, under some embodiments.

FIG. 8 is a block diagram of a computer system used to execute one or more software components of a clustered backup appliance access process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/

LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   maintaining one or more Mtrees in each data node of a clustered backup appliance comprising a plurality of virtual machines controlled by a hypervisor supporting each data node;
   receiving a customer specified configuration of a net group of a plurality of net groups, and comprising a pool of IP addresses and a configuration to apply to each node assigned to the net group, wherein the pool of IP addresses provides access to the one or more Mtrees in a respective data node, wherein the net groups are organized into at least one of management, data, and interconnect functions;
   providing a management node in one of the hypervisors that assigns respective IP addresses from the pool of IP addresses to new nodes assigned to the net group;
   using an IP address associated with a data node to allow access to the one or more Mtrees on the data node by clients connected to any IP address on other data nodes of the clustered backup appliance; and
   associating a respective port group maintained in a hypervisor with at least one net group in a data center, wherein the functions each define a type of the respective port group to be at least one of a management, data or interconnect port group.

2. The method of claim 1 wherein the configuration comprises characteristics selected from the groups consisting of: network associations, subnetwork associations, virtual LAN identifiers for interconnect, security settings, and access privileges.

3. The method of claim 1 wherein the clustered backup appliance is part of a deduplication backup system operated by a backup server.

4. The method of claim 3 wherein the Mtree stores files and directories in a respective node in the deduplication backup system.

5. The method of claim 4 wherein the Mtree comprises user-defined logical partitions of a file system of the deduplication backup system.

6. The method of claim 1 wherein each port group of a specific type attaches to a corresponding interface on each node of the clustered backup appliance.

7. The method of claim 6 further comprising enumerating respective sets of switch ports corresponding to each port group of the certain type.

8. A system comprising:
   a database maintaining one or more Mtrees in each data node of a clustered backup appliance comprising a plurality of virtual machines controlled by a hypervisor supporting each data node;
   an interface receiving a customer specified configuration of a net group of a plurality of net groups, and comprising a pool of IP addresses and a configuration to apply to each node assigned to the net group provides, wherein the pool of IP addresses provides access to the one or more Mtrees in a respective data node, wherein the net groups are organized into at least one of management, data, and interconnect functions; and
   a configuration component providing a management node in one of the hypervisors that assigns respective IP addresses from the pool of IP addresses to new nodes assigned to the net group, and using an IP address associated with a data node to allow access to the one or more Mtrees on the data node by clients connected to any IP address on other data nodes of the clustered backup appliance, wherein the configuration comprises characteristics selected from the groups consisting of: network associations, subnetwork associations, virtual LAN identifiers for interconnect, security settings, and access privileges, and further wherein the functions each define a type of the respective port group to be at least one of a management, data or interconnect port group.

9. The system of claim 8 further comprising associating a respective port group maintained in a hypervisor with at least one net group in a data center.

10. The system of claim 8 wherein the clustered backup appliance is part of a deduplication backup system operated by a backup server.

11. The system of claim 10 wherein the Mtree stores files and directories in a respective node in the deduplication backup system.

12. The system of claim 11 wherein the Mtree comprises user-defined logical partitions of a file system of the deduplication backup system.

13. The system of claim 8 wherein each port group of a specific type attaches to a corresponding interface on each node of the clustered backup appliance, and respective sets of switch ports are enumerated corresponding to each port group of the certain type.

14. A computer program product, comprising a non-transitory computer-readable medium having a computer-readable program code embodied therein, the computer-readable program code adapted to be executed by one or more processors to implement a method comprising:

maintaining one or more Mtrees in each data node of a clustered backup appliance comprising a plurality of virtual machines controlled by a hypervisor supporting each data node;

receiving a customer specified configuration of a net group of a plurality of net groups, and comprising a pool of IP addresses and a configuration to apply to each node assigned to the net group provides, wherein the pool of IP addresses provides access to the one or more Mtrees in a respective data node, wherein the net groups are organized into at least one of management, data, and interconnect functions;

providing a management node in one of the hypervisors that assigns respective IP addresses from the pool of IP addresses to new nodes assigned to the net group; and using an IP address associated with a data node to allow access to the one or more Mtrees on the data node by clients connected to any IP address on other data nodes of the clustered backup appliance, wherein the configuration comprises characteristics selected from the groups consisting of: network associations, subnetwork associations, virtual LAN identifiers for interconnect, security settings, and access privileges, and further wherein the functions each define a type of the respective port group to be at least one of a management, data or interconnect port group.

* * * * *